US010753482B2

(12) United States Patent
Hostetter

(10) Patent No.: US 10,753,482 B2
(45) Date of Patent: Aug. 25, 2020

(54) TAPERED NUT VALVE PLUG FASTENERS

(71) Applicant: Fisher Controls International LLC, Marshalltown, IA (US)

(72) Inventor: Steven Hostetter, Colfax, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 52 days.

(21) Appl. No.: 16/413,267

(22) Filed: May 15, 2019

(65) Prior Publication Data

US 2019/0264817 A1    Aug. 29, 2019

Related U.S. Application Data

(62) Division of application No. 15/461,158, filed on Mar. 16, 2017, now Pat. No. 10,337,623.

(51) Int. Cl.
*F16K 1/48*      (2006.01)
*F16K 1/12*      (2006.01)

(52) U.S. Cl.
CPC ............... *F16K 1/485* (2013.01); *F16K 1/12* (2013.01); *F16K 1/48* (2013.01)

(58) Field of Classification Search
CPC ... F16K 1/485; F16K 1/12; F16K 1/04; F16K 1/48; F16K 1/487; F16K 1/482; F16K 5/0492
(Continued)

(56) References Cited

U.S. PATENT DOCUMENTS 1,529,926 A    3/1925   Scheelk
3,366,364 A    1/1968   Curran
(Continued)

FOREIGN PATENT DOCUMENTS

CN   105020405   11/2015
CN   105697825    6/2016
(Continued)

OTHER PUBLICATIONS

International Searching Authority, "International Search Report and Written Opinion," issued in connection with International Patent Application No. PCT/US2018/020567, dated Jun. 7, 2018, 13 pages.
(Continued)

*Primary Examiner* — Kevin F Murphy
*Assistant Examiner* — Kelsey E Cary
(74) *Attorney, Agent, or Firm* — Hanley, Flight & Zimmerman, LLC

(57) ABSTRACT

Example tapered nut valve plug fastener apparatus disclosed herein include a valve plug, a valve stem, and a nut. The valve plug has a first end, a second end located opposite the first end of the valve plug, and a bore extending from the first end to the second end of the valve plug. The valve stem has a first end, a second end located opposite the first end of the valve stem, and a first tapered surface located between the first end and the second end of the valve stem. The first end of the valve stem extends through the bore The nut is threadably engaged with the first end of the valve stem. The nut includes a second tapered surface. The first tapered surface engages the bore from the first end of the valve plug and the second tapered surface engages the bore from the second end of the valve plug to capture the valve plug between the first and second tapered surfaces, and to rigidly secure the valve plug to the valve stem.

18 Claims, 5 Drawing Sheets

(58) Field of Classification Search
USPC ...... 251/318, 84, 85, 86; 137/15.24, 315.27; 92/255, 257
See application file for complete search history.

(56) References Cited

U.S. PATENT DOCUMENTS

| | | |
|---|---|---|
| 3,820,755 A | 6/1974 | Greenwood et al. |
| 4,304,255 A | 12/1981 | Prince |
| 4,877,363 A | 10/1989 | Williamson et al. |
| 6,213,447 B1 | 4/2001 | Bircann et al. |
| 2006/0125126 A1 | 6/2006 | Sherikar et al. |
| 2009/0146096 A1 | 6/2009 | Davies, Jr. et al. |
| 2015/0276078 A1 | 10/2015 | Xiao et al. |
| 2018/0266569 A1 | 9/2018 | Hostetter |

FOREIGN PATENT DOCUMENTS

| | | |
|---|---|---|
| JP | H07286673 | 10/1995 |
| JP | H09287669 | 11/1997 |
| WO | 2016142468 | 9/2016 |

OTHER PUBLICATIONS

United States Patent and Trademark Office, "Restriction Requirement," issued in connection with U.S. Appl. No. 15/461,158, dated Mar. 15, 2018, 6 pages.

United States Patent and Trademark Office, "Non-Final Office Action," issued in connection with U.S. Appl. No. 15/461,158, dated Nov. 29, 2018, 16 pages.

United States Patent and Trademark Office, "Notice of Allowance and Fee(s) Due," issued in connection with U.S. Appl. No. 15/461,158, dated Mar. 6, 2019, 14 pages.

TAPERED NUT VALVE PLUG FASTENERS

RELATED APPLICATIONS

This disclosure arises from a division of U.S. patent application Ser. No. 15/461,158, filed Mar. 16, 2017, entitled "Tapered Nut Valve Plug Fasteners," the entirety of which is hereby incorporated herein by reference.

FIELD OF THE DISCLOSURE

This disclosure relates generally to fluid valves and, more particularly, to tapered nut valve plug fasteners and related methods.

BACKGROUND

Conventional fluid valves include numerous valve trim components assembled together in a valve body. For example, a valve stem may slide in a seal of a bonnet to move an attached valve plug relative to a valve seat. The fluid valve may be open when the valve plug is moved away from the valve seat and may be closed when the valve plug is engaged with the valve seat.

SUMMARY

Tapered nut valve plug fastener apparatus are disclosed herein. In some disclosed examples, an apparatus includes a valve plug, a valve stem, and a nut. In some disclosed examples, the valve plug has a first end, a second end located opposite the first end of the valve plug, and a bore extending from the first end to the second end of the valve plug. In some disclosed examples, the valve stem has a first end, a second end located opposite the first end of the valve stem, and a first tapered surface located between the first end and the second end of the valve stem. In some disclosed examples, the first end of the valve stem extends through the bore In some disclosed examples, the nut is threadably engaged with the first end of the valve stem. In some disclosed examples, the nut includes a second tapered surface. In some disclosed examples, the first tapered surface engages the bore from the first end of the valve plug and the second tapered surface engages the bore from the second end of the valve plug to capture the valve plug between the first and second tapered surfaces, and to rigidly secure the valve plug to the valve stem.

In some disclosed examples, an apparatus includes a valve plug, a valve stem, and a nut. In some disclosed examples, the valve plug has a first end, a second end located opposite the first end of the valve plug, and a bore extending from the first end to the second end of the valve plug. In some disclosed examples, the valve stem extends through the bore of the valve plug. In some disclosed examples, the valve plug is captured on the valve stem between a first tapered surface of the valve stem that engages the bore from the first end and a second tapered surface of the nut that engages the bore from the second end to rigidly secure the valve plug to the valve stem.

Figure 1:
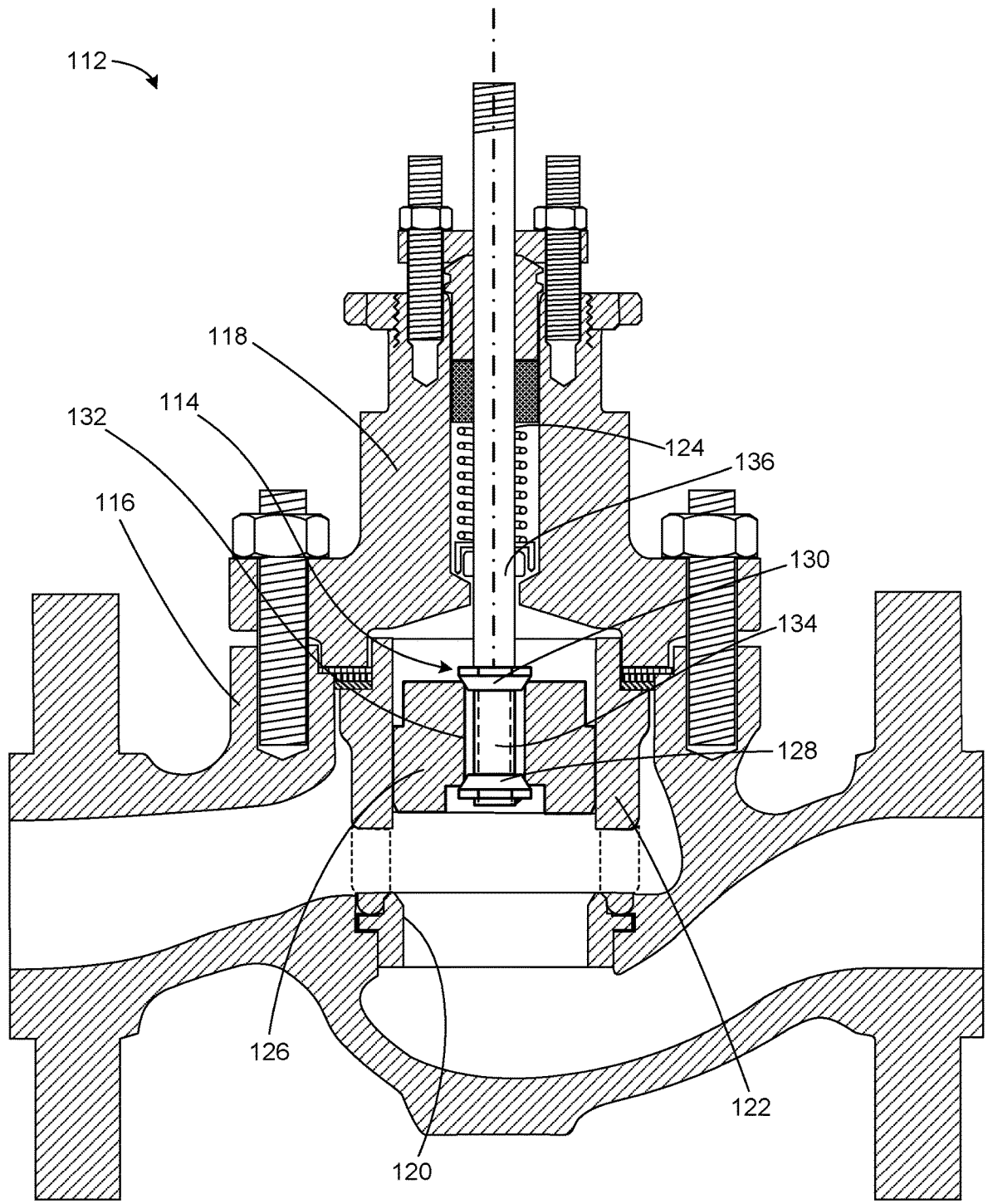
FIG. 1 is a partial cutaway view of an example fluid valve having an example fastener apparatus described herein.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Known fluid valves are typically designed to suit the needs of particular respective applications. As a result, a relatively large number of differently designed fluid valves exist, which necessitates the manufacture and inventorying of a relatively large number of components for these fluid valves. The complexity associated with the manufacturing and inventory management (e.g., part numbers and cross-references) of this relatively large number of fluid valve components results in increased costs.

More specifically, many of the above-mentioned known fluid valves include differently designed trim components that are only used in one or a limited number of fluid valves. For example, there are numerous valve stems having different diameters as well as numerous valve plug designs, each of which may be configured to couple to a particular valve stem via a particular fastening mechanism. Oftentimes, known valve stems have a threaded end that threadably engages with a threaded bore in the valve plug. As such, the thread size and count may vary widely among such valve stems and valve plugs, thereby limiting the number of different valves in which each of these components can be used.

Unlike the known fluid valves mentioned above, the example fluid valves described herein employ a valve plug having a relatively large central bore (e.g., a central passage) that can receive a relatively wide range of valve stem diameters. The central bore of the valve plug is unthreaded and, thus, does not directly engage the threaded end of the valve stems. Further, the central bore of the valve plug is sized to provide sufficient clearance between the largest diameter valve stem to be used and the wall of the central bore to enable this largest diameter valve stem to be centralized in the bore of the valve plug despite dimensional tolerances. In the examples described herein, the threaded end of the valve stem passes through the central bore in the valve plug and a nut having a tapered surface is tightened on the threaded end of the valve stem such that the tapered surface engages the bore in the valve plug to fix the valve plug to the valve stem. The tapered surface acts to centralize the valve stem relative to the bore in the valve plug as the nut is tightened, thereby enabling valve stems having different diameters to be mated to the valve plug. The tapered surface further acts to seal the bore to prevent process fluid leakage through the valve plug. In some examples described herein, tapered surfaces in addition to that provided by the nut noted above may be used. For example, a second tapered nut may be used such that each end of the central bore in the valve plug is captured by a respective tapered nut. In another example, a portion of the valve stem may include a tapered surface that engages the end of the valve plug bore opposite the end at which the tapered nut is fastened. In examples described herein, the ends of the valve plug bore may include respective tapered or beveled surfaces that are complementary to the tapered surfaces of the nut and/or the valve stem to facilitate alignment (e.g., centralization of the stem in the plug) and increase the amount of material engagement between the valve stem, the fastening nut(s) and the valve plug. In examples described herein, the ends of the valve plug bore may include respective radiused surfaces to receive the tapered surfaces of the nut and/or the valve stem to facilitate compatibility between the valve stem, the fastening nut(s) and the valve plug.

FIG. 1 is a partial cutaway view of an example fluid valve 112 having an example fastener apparatus 114 described herein. In the illustrated example of FIG. 1, the fluid valve 112 includes a valve body 116, a bonnet 118, a valve seat 120, a cage 122, a valve stem 124, and a valve plug 126. The example fastener apparatus 114 includes a first nut 128 and a second nut 130. The valve plug 126 includes a central bore 132. The valve stem 124 includes a threaded end 134, a smooth region 136, and a screw thread taper (not shown in FIG. 1). The screw thread taper provides a transition between the smooth region 136 and the threaded end 134. The nuts 128,130 may include respective internal threads.

In the illustrated example of FIG. 1, the second nut 130 is threadably engaged with the valve stem 124 via the threaded end 134 and the screw thread taper, specifically the second nut 130 is tightened on the threaded end 134 against the screw thread taper until a locking friction is achieved between the internal threads and the threaded end 134. The valve stem 124 passes through the central bore 132. The second nut 130 engages the central bore 132. The first nut 128 is threadably engaged with the valve stem 124 via the threaded end 134. The first nut 128 is also engaged with the central bore 132. Thus, the valve plug 126 is captured on the valve stem 124 between the first nut 128 and the second nut 130.

Figure 2:
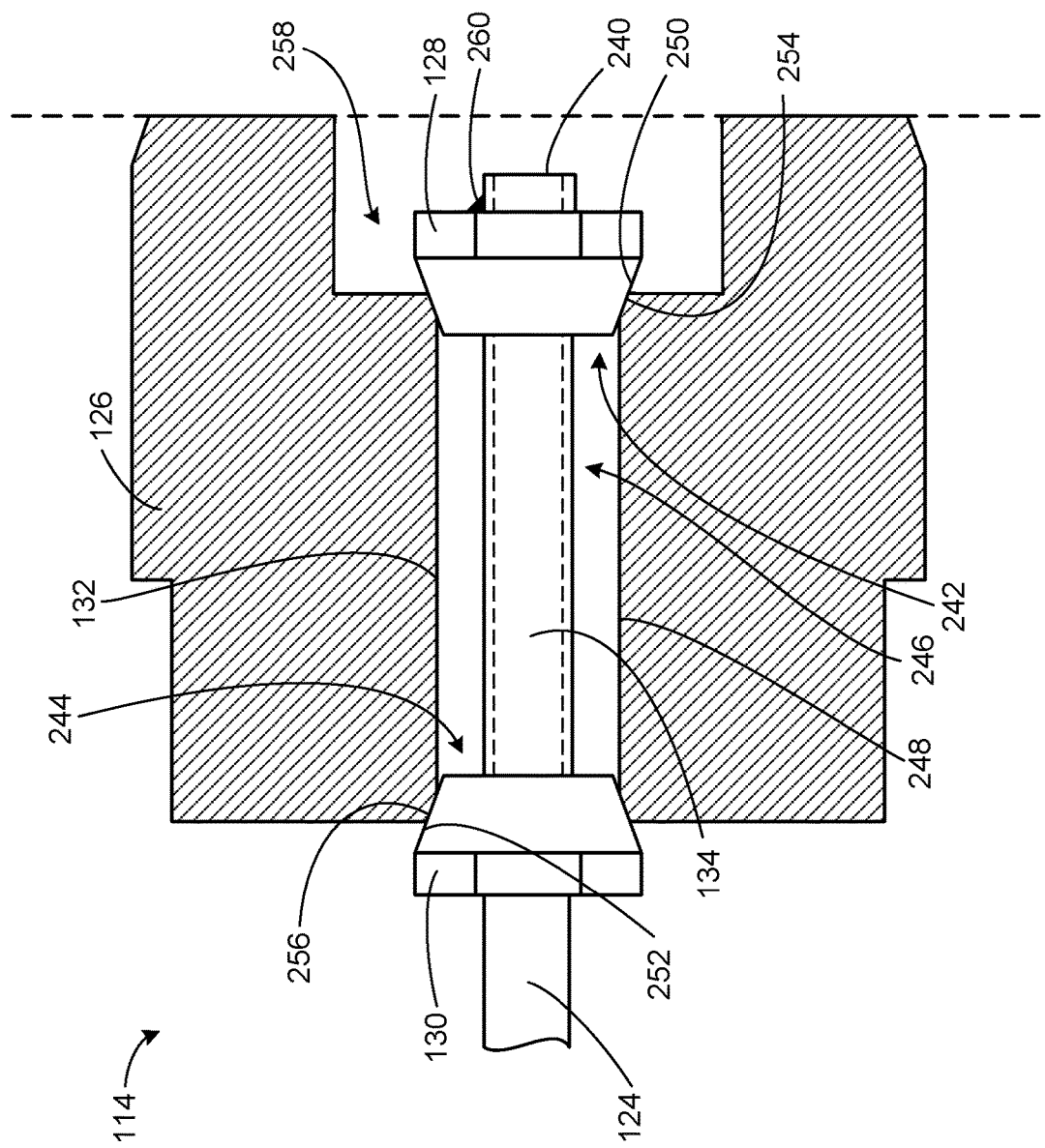
FIG. 2 is a partial cutaway view of the example fastener apparatus of FIG. 1.

FIG. 2 is a partial cutaway view of the fastener apparatus 114 of FIG. 1. As clearly shown in FIG. 2, the threaded end 134 of the valve stem 124 passes through the central bore 132 of the valve plug 126 and is fixed to the valve stem 124 via the first and second nuts 128, 130. In the example of FIG. 2, the first nut is 128 threadably engaged with the threaded end 134 on the valve stem 124 adjacent an end 240 of the valve stem 124 to engage a first aperture 242 of the central bore 132 of the valve plug 126. In a similar manner, the second nut 130 is threadably engaged with the threaded end 134 on the valve stem 124 to engage a second aperture 244 of the central bore 132 of the valve plug 126. Thus, the nuts 128, 130 capture the valve plug 126 on the valve stem 124 via the central bore 132. As can be seen in FIG. 2, a clearance space 246 is provided between the valve stem 124 and an outer wall 248 of the central bore 132. Additionally, the first and second nuts 128, 130 include respective first and second tapered surfaces 250, 252 that engage the apertures 242, 244 of the central bore 132. The engagement of the tapered surfaces 250, 252 against the apertures 242, 244 causes the valve stem 124 to be centralized in the central bore 132 and seals the central bore 132 to prevent process fluid from passing through the valve plug 126. As shown in FIG. 2 the apertures 242, 244 of the central bore 132 may include respective third and fourth tapered surfaces 254, 256 (e.g., seats) that are complementary to the first and second tapered surfaces 250, 252, respectively. The third and fourth tapered surfaces 254, 256 may be included as shown to facilitate the centralization of the valve stem 124 in the central bore 132, form seals with the nuts 128, 130, and/or to increase the amount of surface area engagement between the nuts 128, 130 and the valve plug 126. The increased surface area engagement provided by the third and fourth tapered surfaces 254, 256 may distribute the load applied by the nuts 128, 130 to the valve plug 126 and/or may serve to prevent rotation of the valve plug 126 relative to the valve stem 124 during use.

As depicted in FIG. 2, the valve plug 126 may also include a cavity 258 or recess in which the first nut 128 and the end 240 of the valve stem 124 are shielded from fluid flow within the valve body 116 of FIG. 1. Additionally, a weld 260 may be used to fix the first nut 128 to the valve stem 124 to prevent the first nut 128 from rotating or loosening after it has been tightened against the valve plug 126.

To assemble the example fastener apparatus 114 of FIG. 2, the second nut 130 is threaded onto the valve stem 124, the valve stem 124 is passed through the central bore 132 to engage the second nut 130 with the fourth tapered surface 256, and the first nut 128 is tightened on the threaded end 134 against the third tapered surface 254 to tension the valve stem 124. Thus, the valve stem 124 is aligned with the central bore 132 and centralized in the valve plug 126. In some examples, the first nut 128 is tightened against the third tapered surface 254 until a locking friction is achieved between the internal threads of the first nut 128 and the threaded end 134. Further, the first nut 128 may be welded to the valve stem 124 to form the weld 260. Thus, the valve plug 126 may be permanently attached to the valve stem 124.

Additionally or alternatively, any type of anti-rotation device may be employed to fix the first nut 128 relative to the valve stem 124 (e.g., adhesive, a polymer lining in the first nut 128, safety wire, etc.).

Figure 3:
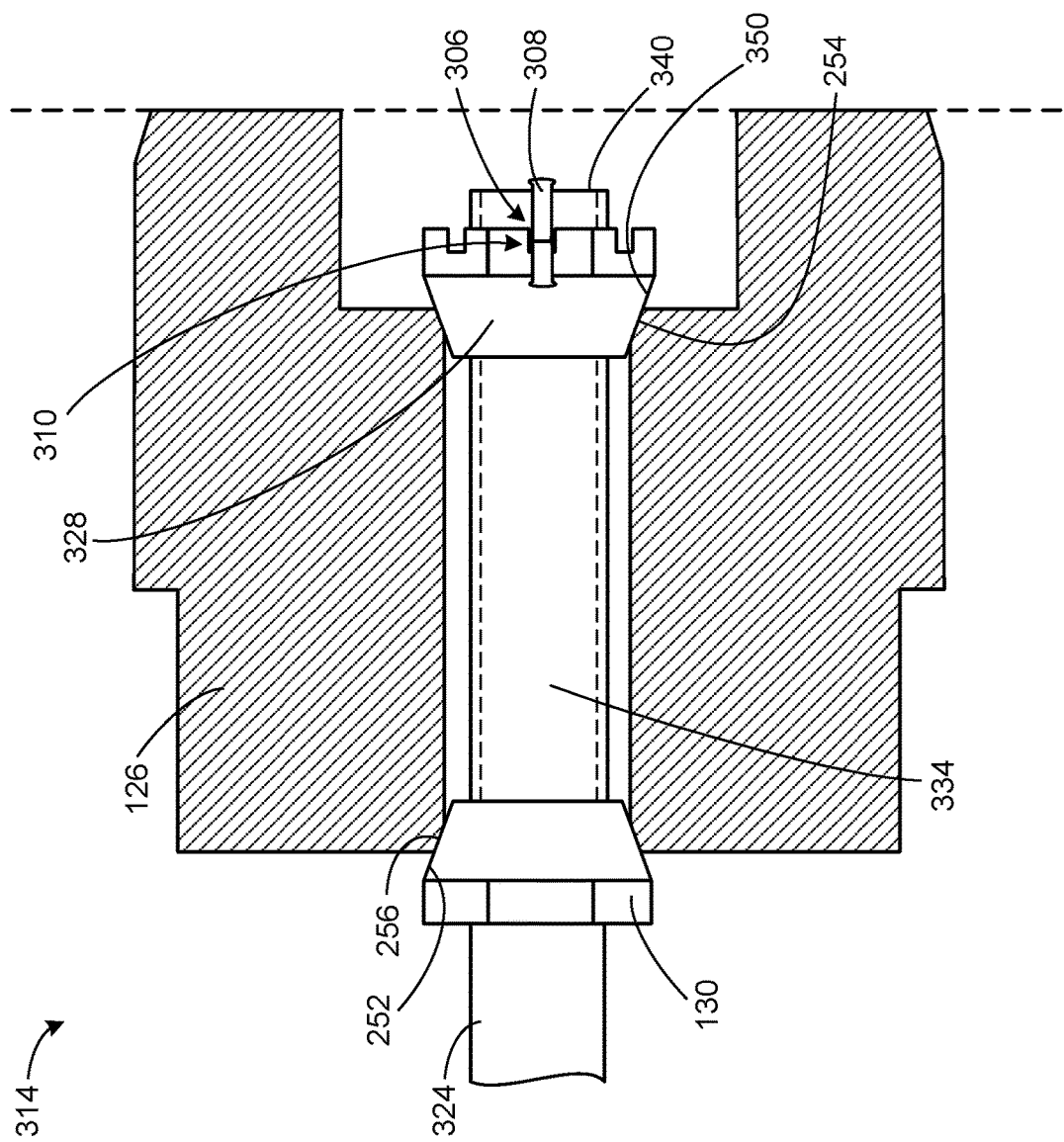
FIG. 3 is a partial cutaway view of an alternative example fastener apparatus that may be used in place of the example fastener apparatus of FIGS. 1 and 2.

FIG. 3 depicts a partial cutaway view of an alternative fastener apparatus 314 that may be used in place of the example fastener apparatus 114 of FIGS. 1 and 2. In the example of FIG. 3, a valve stem 324 is fixed to the valve plug 126 via nuts 328, 130 having tapered surfaces 350, 252 as in the example of FIGS. 1 and 2 described above. However, in this example, the first nut 328 is a castled nut and the valve stem 324 includes a transverse hole 306 at an end 340 of the valve stem 324 to receive a cotter pin 308. As shown, the cotter pin 308 passes through opposing recesses 310 (only one is visible in the view of FIG. 3) in the first nut 328 and the transverse hole 306 to prevent the first nut 328 from rotating or loosening from the valve stem 324 after the first nut 328 has been tightened against the valve plug 126.

The fastener apparatus assembly 314 of FIG. 3 is assembled as in the example of FIG. 2 described above. However, in this example, after tightening the first nut 328 against the third tapered surface 254, the cotter pin 308 is inserted through the transverse hole 306 and the recesses 310. The cotter pin 308 may then be bent around the first nut 328 and the end 340 to retain the cotter pin 308 in the transverse hole 306 and the recesses 310, as shown in the example of FIG. 3. Thus, the valve plug 126 may be removed from the valve stem 324 by removing the cotter pin 308 (e.g., during maintenance, cleaning, disassembly, part replacement, etc.).

Figure 4:
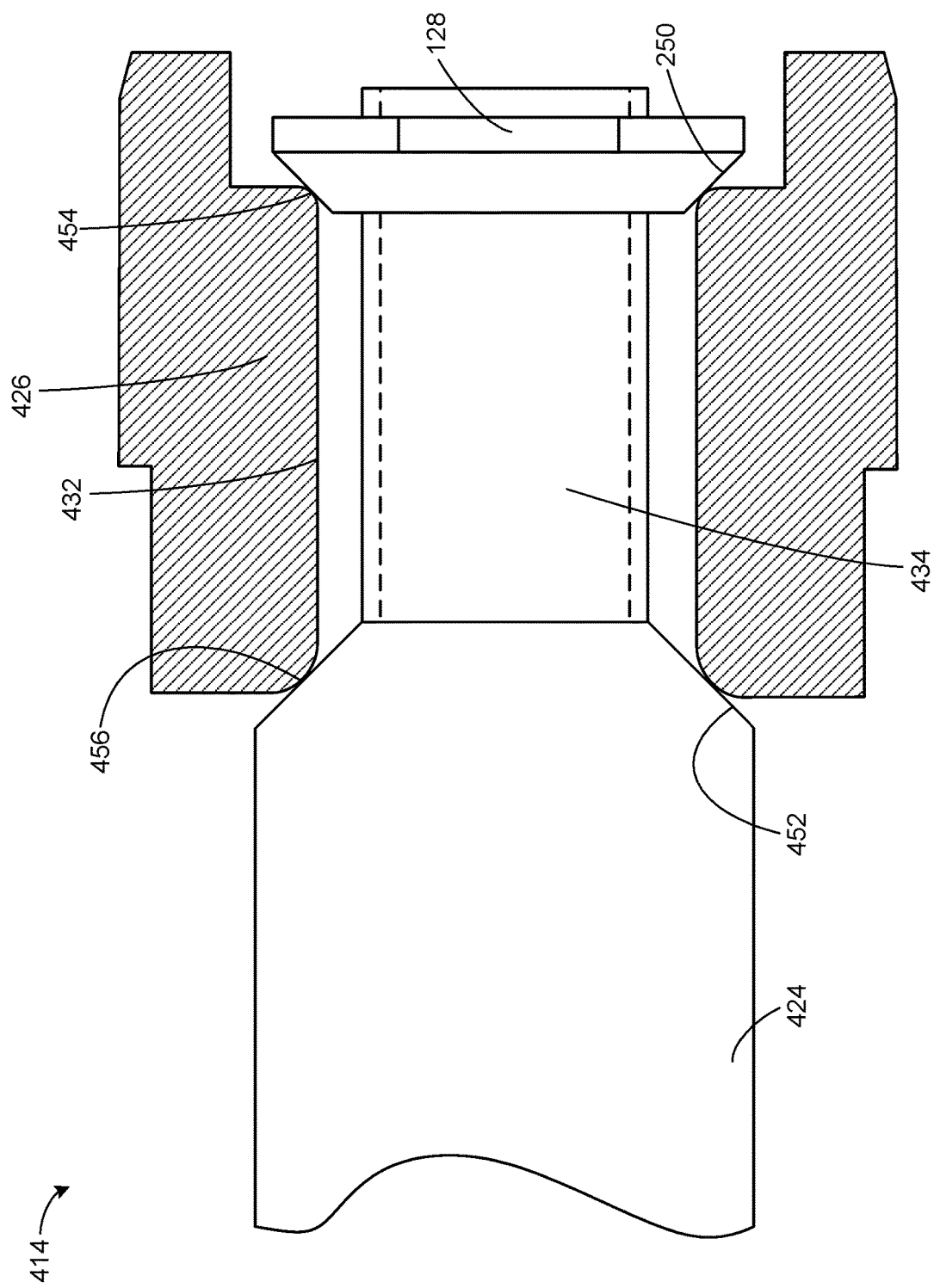
FIG. 4 is a partial cutaway view of a further alternative example fastener apparatus that may be used in place of the example fastener apparatus of FIGS. 1-3.

FIG. 4 depicts a partial cutaway view of a further alternative fastener apparatus 414 that may be used in place of the example fastener apparatus 114, 314 of FIGS. 1-3. In the example of FIG. 4, a valve stem 424 is fixed to a valve plug 426 via the first tapered surface 250 of the first nut 128 and a second tapered surface 452, as in the example of FIGS. 1-3 described above. However, in this example, the second tapered surface 452 is included in (e.g., is integral with) the valve stem 424. Thus, the second nut 130 of FIGS. 1-3 is eliminated. In the illustrated example of FIG. 4, the valve stem 424 also includes a threaded end 434. In the illustrated example of FIG. 4, the valve plug 426 includes a central bore 432 and first and second radiused surfaces 454, 456. The second tapered surface 452 is engaged with the second radiused surface 456. The first tapered surface 250 of the first nut 128 is engaged with the first radiused surface 454. The first and second radiused surfaces 454, 456 may be included as shown to facilitate compatibility between the valve stem 424, the first nut 128, and the valve plug 426. The rounded edge provided by the first and second radiused surfaces 454, 456 may accommodate varying taper angles of the first and second tapered surfaces 250, 452. Also, the first and second radiused surfaces 454, 456 and the first and second tapered surfaces 250 452 may serve to seal the central bore 432 to prevent leakage of process fluid through the valve plug 426 and/or to centralize the valve stem 424 in the valve plug 426. Further, the valve plug 426 may be used in conjunction with the valve stems 124, 324 and the nuts 128, 130, 328 of FIGS. 1-3.

To assemble the example fastener apparatus assembly 414 of FIG. 4, the threaded end 434 of the valve stem 424 is passed through the central bore 432 to engage the second tapered surface 452 with the second radiused surface 456 and the first nut 128 is tightened on the threaded end 434 against the first radiused surface 454 to tension the valve stem 424. Thus, the valve plug 426 is captured on the valve stem 424 between the second tapered surface 452 and the first tapered surface 250. In some examples, the first nut 128 is tightened against the first radiused surface 454 until a locking friction is achieved between the internal threads of the first nut 128 and the threaded end 434. Additionally, an anti-rotation device (e.g., the weld 260 of FIG. 2) may fix the first nut 128 to the valve stem 424 (not shown in FIG. 4). Alternatively, the castled first nut 328 and the cotter pin 308 of FIG. 3 may be used with the valve stem 424 (not shown in FIG. 4). In some such examples, the valve stem 424 includes a transverse hole to accept the cotter pin 308 (not shown in FIG. 4).

Figure 5:
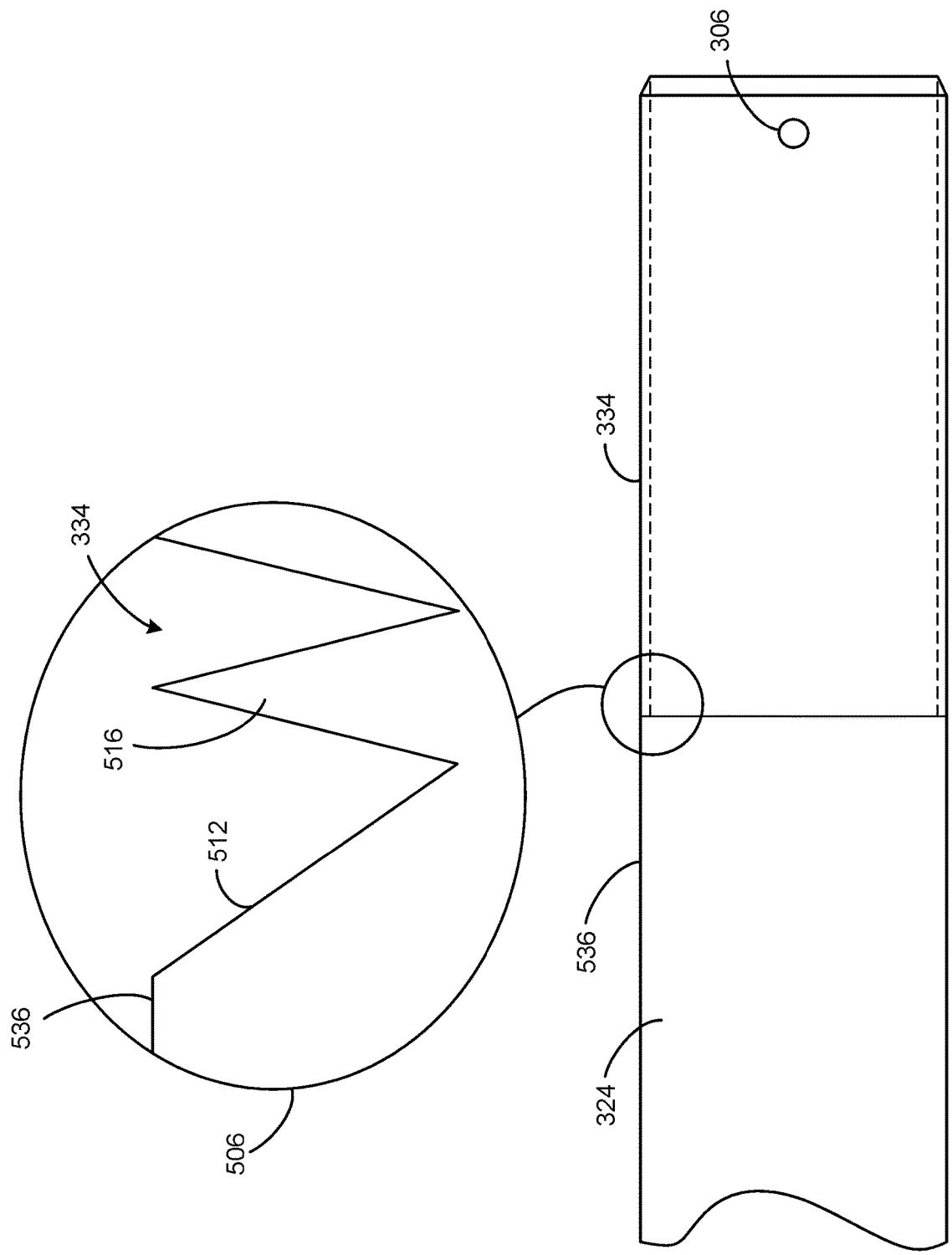
FIG. 5 is a side view and an enlargement of the valve stem of the example fastener apparatus assembly of FIG. 3.

FIG. 5 is a side view and an enlargement 506 of the valve stem 324 of the example fastener apparatus assembly 314 of FIG. 3. In the illustrated example of FIG. 5, the transverse hole 306 is more visible. In the illustrated example of FIG. 5, the valve stem 324 includes the threaded end 334 and a smooth region 536. As shown in the enlargement 506, the valve stem 424 also includes a screw thread taper 512. As also shown in the enlargement, the threaded end 334 includes external threads 516. The screw thread taper 512 provides a transition between the external threads 516 and the smooth region 536. In operation, the second nut 130 of FIGS. 1-3 (not pictured in FIG. 5) is tightened against the screw thread taper 512 until a locking friction is achieved between the internal threads of the second nut 130 and the external threads 516.

From the foregoing, it will be appreciated that the above disclosed apparatus and articles of manufacture may increase interchangeability between valve stems and valve plugs. Thus, the number of part numbers and associated part management costs may be reduced. Further, the number of valve stems and/or valve plugs held in inventory and associated storage costs may be reduced. Further, the assembly complexity of the valve stem and valve plug combination and associated manufacturing costs may be reduced.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a valve plug having a first end, a second end located opposite the first end of the valve plug, and a bore extending through the valve plug between the first and second ends of the valve plug, the bore including a first end oriented toward the first end of the valve plug, a second end oriented toward the second end of the valve plug, a first rounded edge extending from the first end of the bore toward the second end of the bore, and a second rounded edge extending from the second end of the bore toward the first end of the bore;
   a valve stem having a first end, a second end located opposite the first end of the valve stem, and a first tapered surface located between the first and second ends of the valve stem, the first end of the valve stem extending through the bore; and
   a nut threadably engaged with the first end of the valve stem, the nut including a second tapered surface, wherein the first tapered surface extends into the first end of the bore and engages the first rounded edge and the second tapered surface extends into the second end of the bore and engages the second rounded edge to capture the valve plug between the first tapered surface and the second tapered surface and to rigidly secure the valve plug to the valve stem.

2. The apparatus of claim 1, wherein the second end of the valve plug is configured to contact a valve seat.

3. The apparatus of claim 1, wherein the nut and the first end of the valve stem are disposed in a cavity formed in the second end of the valve plug, the cavity configured to shield the nut and the first end of the valve stem from a fluid flow within a valve body containing the valve plug.

4. The apparatus of claim 1, wherein the first and second rounded edges and the first and second tapered surfaces are shaped to seal the bore.

5. The apparatus of claim 1, wherein the first and second rounded edges and the first and second tapered surfaces are shaped to prevent leakage of process fluid through the valve plug.

6. The apparatus of claim 1, wherein the first and second rounded edges and the first and second tapered surfaces are shaped to centralize the valve stem relative to the valve plug.

7. The apparatus of claim 1, further including means for retaining the nut on the valve stem.

8. The apparatus of claim 7, wherein the means for retaining is a weld.

9. The apparatus of claim 7, wherein the means for retaining includes a cotter pin.

10. An apparatus comprising:
    a valve plug having a first end, a second end located opposite the first end of the valve plug, and a central bore extending through the valve plug between the first and second ends of the valve plug, the central bore including a first end oriented toward the first end of the valve plug, a second end oriented toward the second end of the valve plug, a first rounded edge extending from the first end of the central bore toward the second end of the central bore, and a second rounded edge extending from the second end of the central bore toward the first end of the central bore;

a nut; and a valve stem extending through the central bore of the valve plug, the valve plug being captured on the valve stem between a first tapered surface of the valve stem and a second tapered surface of the nut, wherein the first tapered surface extends into the first end of the central bore and engages the first rounded edge and the second tapered surface extends into the second end of the central bore and engages the second rounded edge to rigidly secure the valve plug to the valve stem.

11. The apparatus of claim 10, wherein the second end of the valve plug is configured to contact a valve seat.

12. The apparatus of claim 10, wherein the nut and an end of the valve stem are disposed in a cavity formed in the second end of the valve plug, the cavity configured to shield the nut and the end of the valve stem from a fluid flow within a valve body containing the valve plug.

13. The apparatus of claim 10, wherein the first and second rounded edges and the first and second tapered surfaces are shaped to seal the central bore.

14. The apparatus of claim 10, wherein the first and second rounded edges and the first and second tapered surfaces are shaped to prevent leakage of process fluid through the valve plug.

15. The apparatus of claim 10, wherein the first and second rounded edges and the first and second tapered surfaces are shaped to centralize the valve stem relative to the valve plug.

16. The apparatus of claim 10, further including means for retaining the nut on the valve stem.

17. The apparatus of claim 16, wherein the means for retaining is a weld.

18. The apparatus of claim 16, wherein the means for retaining includes a cotter pin.

\* \* \* \* \*